Figure 1:
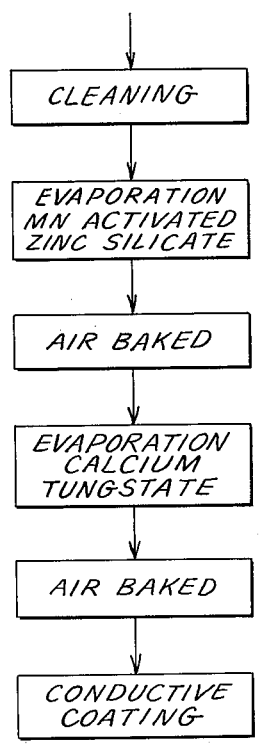

April 18, 1961 P. SEATS 2,980,550
EVAPORATED PHOSPHOR SCREEN
Filed Jan. 15, 1958

INVENTOR
Peter Seats
BY
ATTORNEYS ganese activated zinc silicate phosphor and a second layer of calcium tungstate, the first layer luminescing yellow and the second layer luminescing blue to provide a resultant white luminescence.

2,980,550

EVAPORATED PHOSPHOR SCREEN

Peter Seats, Lake Hiawatha, N.J., assignor to Thomas Electronics, Incorporated, Passaic, N.J., a corporation of New Jersey Filed Jan. 15, 1958, Ser. No. 708,992

3 Claims. (Cl. 117—33.5)

This invention relates to a process for depositing materials on a solid surface in order to form a luminescent screen and more particularly relates to a method of forming an improved transparent screen.

At the present time luminescent screens such as those use in cathode ray tubes and television tubes are usually formed from phosphor powders applied directly to the glass viewing face by means of some type of settling or slurrying process. One of the disadvantages of such conventional powder base luminescent screens is their tendency toward halation under excitation. That is to say, when a cathode ray or electron beam strikes the phosphor or luminescent layer, a certain amount of the light which is emitted proceeds directly through the viewing face to the eye of the observer. Some of the light, however, is diffusely scattered by the phosphor particles within the screen to illuminate adjacent unexcited particles. Some of the light produced in this screen is also reflected at various angles from the near and far surfaces of the glass viewing face back into the screen to illuminate unexcited areas. The net result is a halo around the excited spot in the screen which produces less than optimum resolution and contrast in the image which is produced.

It is well known, however, that phosphor coatings in the form of continuous transparent films do not suffer from these serious resolution and contrast losses, but a major difficulty in utilizing screens of this transparent type has been caused, hitherto, by a lack of control over the color of the screen, particularly with regard to "white" screens, which are desirable for television viewing.

According to the present invention, it has now been found that it is possible to provide a transparent evaporated phosphor screen possessed of high resolution and contrast by the deposition of two selected luminescent layers which are excited simultaneously or sequentially to produce a white luminescence. The screens produced by means of this process display a relatively high efficiency and the phosphor films are rugged and not sensitive to poisoning. A wide degree of control over the color of the luminescence is also provided.

It is accordingly a primary object of the present invention to provide an improved transparent phosphor screen in cathode ray tubes and television picture tubes and a method of forming such a screen.

It is another object of the invention to provide a process for forming an improved transparent evaporated phosphor screen formed of a plurality of transparent phosphor layers which under excitation produce complementary colors to yield a white luminescence.

It is another object of the invention to provide a method of forming improved transparent phosphor screens consisting of a first transparent phosphor layer which luminesces yellow and an overlying transparent phosphor layer which luminesces blue to produce a resulting white luminescence.

It is another object of the invention to provide a method for producing an improved transparent phosphor screen consisting of the steps of forming a first layer of manganese activated zinc silicate phosphor and a second layer of calcium tungstate, the first layer luminescing yellow and the second layer luminescing blue to provide a resultant white luminescence.

These and further objects and advantages of the invention will become more apparent upon reference to the following specification and claims wherein the method of forming such screens is set out in detail.

Figure 2:
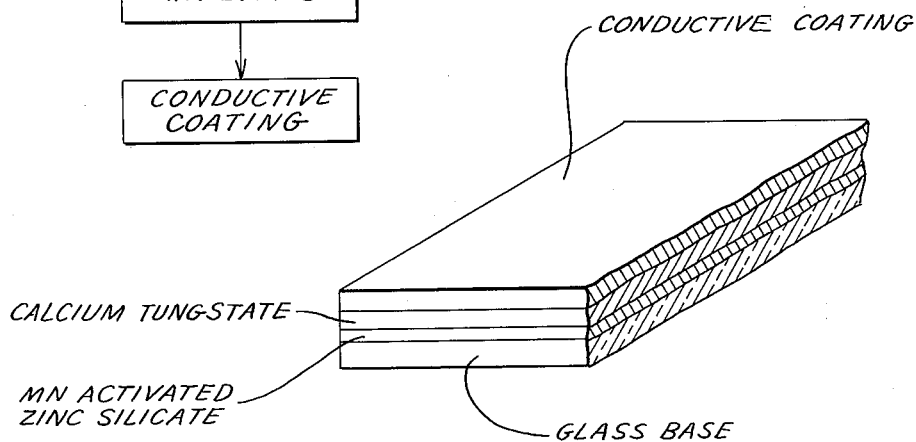

Figure 1 is a flow diagram illustrating the process in accordance with the present invention; and Figure 2 illustrates the article produced by the process of Figure 1.

High vacuum apparatus of the type designed for optical film deposition and capable of attaining pressures of $2 \times 10^{-5}$ mm. of mercury or lower is suitable for evaporating phosphor films on glass plates. Such apparatus is normally fitted with a base plate which supports a bell jar, the base plate being provided with vacuum-tight insulated terminals for passing a current through a resistive heater in order to sublimate the coating material. The diameter of the bell jar and supports therein will govern the size of the plates to be coated. Whilst much of the development of transparent screens has taken place on glass plates which are subsequently enclosed in a cathode ray tube envelope or sealed directly to a cathode ray tube funnel, there is no difficulty in preparing identical screens directly on the face plates of cathode ray tube envelopes which are formed from an appropriate heat resisting glass. The apparatus required for coating cathode ray tube envelopes directly resembles in many respects conventional cathode ray tube aluminizing apparatus. According to the present invention, the glass plate is first cleaned and then placed in position in the bell jar. The system is then evacuated and when a satisfactory pressure is attained, a current is passed through a small tantalum or tungsten boat which contains the material to be evaporated. The current is adjusted so that the boat temperature is appropriate to allow a slow even evaporation to take place without spitting. The thickness of the coating may be controlled by measuring the change in the light reflected by, or transmitted through, the plate, or more simply by evaporating completely the boat contents. At the conclusion of evaporation, the current supply is turned off, air is admitted into the system and the plate removed for baking.

By means of the foregoing procedure, a first layer of manganese activated zinc silicate phosphor is evaporated to form a phosphor layer which after baking in air luminesces yellow on electron bombardment. A second layer is then formed over the first and consists of calcium tungstate and the two layers are then refired. The second layer luminesces blue and by adjusting the second layer thickness in relation to the anode voltage, it is possible to excite both layers simultaneously and provide a white luminescence.

The transparent screen thus formed is then coated with a further layer of a transparent or opaque conducting material such as tin oxide, silver, aluminum, or carbon in order to prevent charging or sticking of the screen, a well known phenomenon caused by inadequate screen secondary emission characteristics.

Figure 1 is a flow diagram of the process according to the present invention, and Figure 2 shows the resulting article with legends indicating the material of the several layers.

According to an illustrative specific example of the process of the invention, a zinc silicate phosphor containing 8% manganese is evaporated onto the inner surface of a hard glass television tube envelope. After the evaporation step the phosphor layer is fired in air at approximately 600° C. for one hour. A second layer consisting of calcium tungstate is then evaporated over the first layer and the two layers refired at 500° C. for thirty minutes. The tube is then aluminized according to any suitable procedure, such as that disclosed in the assignee's copending application Serial No. 488,796, filed February 17, 1955, now Patent No. 2,851,987.

By adjusting the thickness of the two layers in relation to the anode voltage, it is possible to adjust the color of the luminescence achieved to secure the optimum white desired. In a specific example, with an anode voltage of 10 kv. a first layer having thickness of 1.0 micron may be used with a second layer thickness of approximately 0.25 micron to secure a satisfactory white luminescence.

The screen produced according to this method exhibits a relatively high efficiency, is rugged and not sensitive to poisoning, and presents a very high resolution and contrast. Control of the color of luminescence is readily possible by adjustment of layer thickness with respect to the anode voltage and specific color control of the yellow layer is possible by varying the manganese content of the zinc silicate or the degree of heating.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of forming a luminescent screen in a cathode ray tube which comprises evaporating a zinc silicate phosphor containing manganese and condensing the vapor upon a hard glass envelope, firing the condensed phosphor in air at a temperature of approximately 600° C. for approximately one hour to produce a first transparent phosphor layer, evaporating calcium tungstate, condensing the vapor on said first layer, and firing the superposed layers in air at a temperature of approximately 500° C. for approximately one half hour.

2. A luminescent screen produced according to the process of claim 1.

3. A method of forming a luminescent screen in a cathode ray tube which comprises evaporating a zinc silicate phosphor containing manganese and condensing the vapor upon a hard glass envelope, firing the condensed phosphor in air at an elevated temperature to produce a first transparent phosphor layer, evaporating calcium tungstate, condensing the vapor on said first layer, and firing the superposed layers in air at an elevated temperature.

References Cited in the file of this patent
UNITED STATES PATENTS

| | | |
|---|---|---|
| 2,504,674 | Fonda | Apr. 18, 1950 |
| 2,600,579 | Ruedy et al. | June 17, 1952 |
| 2,654,675 | Thierfelder | Oct. 6, 1953 |
| 2,685,530 | Cusano et al. | Aug. 3, 1954 |
| 2,689,190 | Hushley | Sept. 14, 1954 |
| 2,732,312 | Young | Jan. 24, 1956 |